March 19, 1929.    H. B. FANTON    1,706,221
SEPARATOR FOR FUR, WOOL, AND COTTON
Filed Oct. 6, 1928
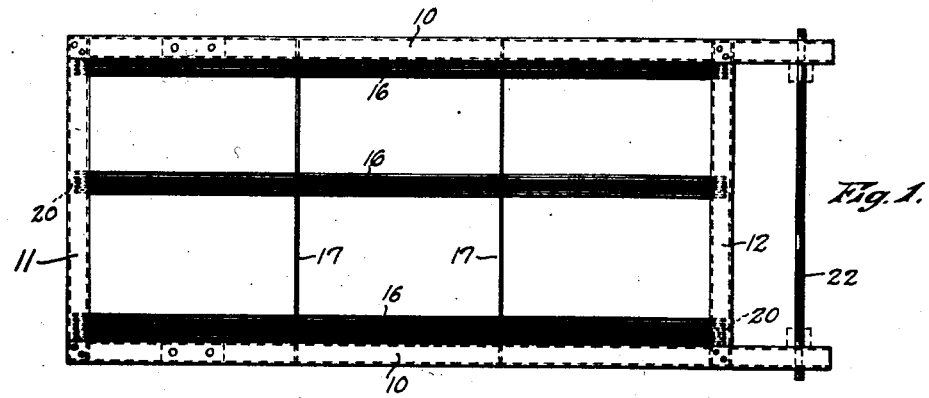
Fig. 1.
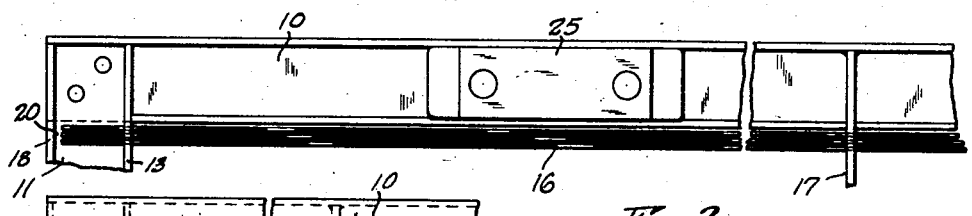
Fig. 2.
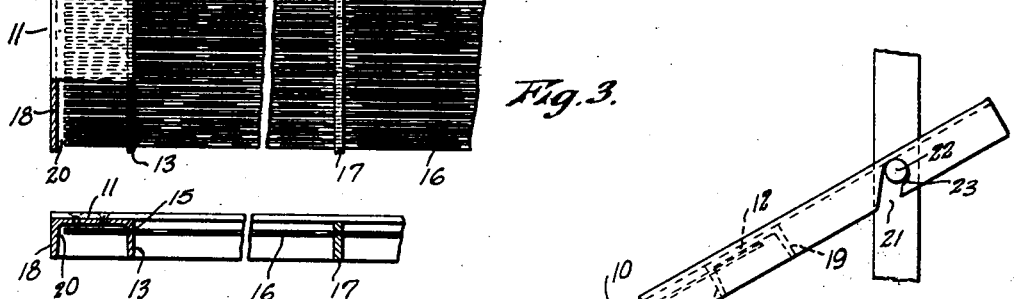
Fig. 3.
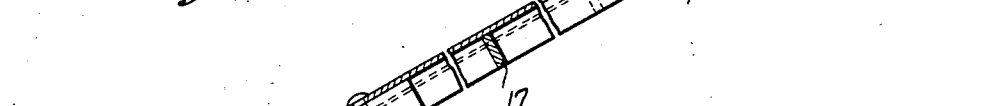
Fig. 4.
Fig. 5.
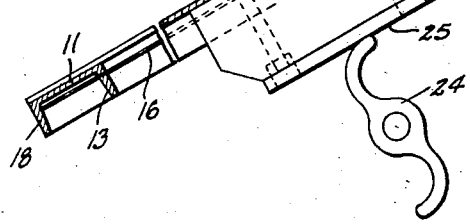
Inventor
Harry B. Fanton
By Wooster & Davis
Attorneys Patented Mar. 19, 1929.

1,706,221

UNITED STATES PATENT OFFICE.

HARRY B. FANTON, OF DANBURY, CONNECTICUT, ASSIGNOR OF ONE-HALF TO HARRY SACHS, OF DANBURY, CONNECTICUT.

SEPARATOR FOR FUR, WOOL, AND COTTON.

Application filed October 6, 1928. Serial No. 310,860.

This invention relates to a separator for fur, wool, cotton or other fibre and particularly to an improved separator for a fur blowing machine although it is by no means limited to such use, but may be used for separating wool, cotton or other fibre from dirt and the like.

It has for an object to provide an improved construction of separator which may be operated indefinitely without breaking with the consequent loss of material or time necessary for repairs.

It is also an object of the invention to provide an improved mounting for the separator whereby it may be easily and quickly removed or placed in position, and this may be done if desired while the machine is operating.

With the foregoing and other objects in view, the invention consists in certain novel features of construction, combinations and arrangements of parts as will be more fully disclosed in connection with the accompanying drawing.

In this drawing,

Fig. 1 is a top plan view of the separator, a number of the wires being omitted for simplicity of illustration.

Fig. 2 is a bottom plan view of a portion of one side and one end of the separator on an enlarged scale.

Fig. 3 is a top plan view of a portion of one side and one end of the separator.

Fig. 4 is a longitudinal section through one end portion of the separator, and

Fig. 5 is a partial side elevation and partial section showing the separator mounted for use in a fur blowing machine.

It is old to use hardened or tempered steel wires in separators for fur or fibre, but if these wires are permanently and rigidly mounted constant vibration soon snaps them off with consequent loss of fur or fibre. A separator has been used which had a wooden frame including wooden cross bars at the opposite ends provided with sockets formed by boring holes inwardly from the vertical side walls of these bars. The openings were somewhat larger than the diameters of the wires with the object of permitting limited longitudinal movement of the wires in the frame, but as the wires must be accurately spaced this required that these openings should be very little larger than the wires, and it was found in operation that the wood soon swelled and tightly gripped the wires and prevented this movement. It was also found that as these openings were closed at their inner ends dirt soon entered and packed tightly around the wires still further preventing movement of the wires.

To overcome these objections I have provided the construction illustrated in the accompanying drawing. This construction comprises a frame having metal side bars 10 and transverse end bars 11 and 12. These bars are rigidly secured together as by bolting or riveting as well as welding so as to make a substantially unitary structure. It is also preferred that these bars be of channel shape in cross section for greater strength and rigidity and the frame may, therefore, be made of channel iron or pressed steel which are arranged so that the open sides of the bars are on the under side of the frame. The inner walls 13 and 14 of the cross bars 11 and 12 respectively are accurately drilled with the required number of openings 15 for the wire strands 16. These openings are accurately spaced as it is important that the strands be kept at an accurate and uniform distance from each other. If the frame is of considerable length it is also preferred to provide any suitable number of transverse bars 17 which may be flat bars also drilled with similarly spaced openings. These bars are secured at their opposite ends to the side bars 10 of the frame so that they are rigidly supported thereby.

The strands 16 are tempered or hardened steel wires and are inserted by passing them through the bars 17 and inserting one end into the openings in the bars 11 or 12. The wire at the opposite end is then swung laterally permitting this latter free end to be inserted in the proper opening in the other end bar. The wires are slightly smaller than the openings so as to be loose therein but are sufficiently near the size of the openings to be accurately and uniformly spaced from each other. The wires are also of a length somewhat less than the distance between the outer walls 18 and 19 of the end bars 11 and 12 respectively, so as to leave a space, as indicated at 20, between these walls and the ends of the wires to thus permit limited longitudinal movement of the wires in the supporting bars. In use the metal of the bars cannot swell and clamp the wire strands, and as the bars 11 and 12 are open at their lower sides any dirt which may pass into the openings for the wire will merely work through and drop out the lower side of the bars. There is, therefore, no chance of this dirt clogging up the openings and preventing this free longitudinal movement of the strands. They will, therefore, last indefinitely without breaking which is not true where the strands become rigidly attached to the frame. If a wire does break it can be easily and quickly removed and a new wire as easily inserted in its place.

I have also provided improved means for mounting this frame which consists in providing the vertical walls of the side beams 10 with notches 21 opening through the lower edges thereof to receive the transverse rod 22, and it is preferred that the upper portion of the recess be somewhat wider, as shown at 23, than the entrance portion so that the frame will not accidentally jump off the rod. In use the separator is inclined, as indicated in Fig. 5, and this lower end is forced upwardly and allowed to drop under action of the rotating knocker 24 engaging suitable pads 25 mounted on the under sides of the bars 10 adjacent their lower ends.

This construction makes a very rigid and effective construction which will operate indefinitely without breaking. The strands of wire are mounted and maintained at accurate and uniform spacing giving a uniform separating operation, and as there is very little breakage of the wires the loss of fur or fibre due to this cause is reduced to a minimum.

Having thus set forth the nature of my invention, what I claim is:

1. In a separator of the character described, a metal frame including cross bars at the opposite ends channel shape in cross section with the open side downward, the inner side walls of said bars being provided with a series of spaced holes therethrough, and a plurality of wires extending between said bars and projecting into said openings, said wires being loose in the openings and of a length less than the distance between the outer side walls of the bars to provide limited endwise movement of the wires in the frame.

2. In a separator of the character described, a metal frame including cross bars at its opposite ends having walls at substantially right angles to the plane of the frame provided with a plurality of openings therein and said bars being open at their under sides, a plurality of wires extending between said bars projecting at their opposite ends into said openings and loose therein, and stop walls spaced outwardly of the ends of the wires to permit limited longitudinal movement of the wires in the frame.

3. In a separator of the character described, a metal frame including spaced side bars having downwardly extending flanges and cross bars adjacent the opposite ends thereof having walls at substantially right angles to the plane of the frame provided with a plurality of spaced openings therein and said bars being open at the under sides thereof, a plurality of wires extending between said bars projecting at their opposite ends into said openings and loose therein, stop walls spaced outwardly of the ends of the wires to permit limited longitudinal movement of the wires in the frame, a horizontal pivotal support, said side bar flanges being provided with notches to engage over said support and hold the frame in inclined position, and a knocker for vibrating the frame.

4. In a separator of the character described, a metal frame comprising side and end bars of substantially channel shape in cross section and arranged with the open sides downwardly, the inner flanges of the end bars being provided with a plurality of openings, a plurality of wires loosely mounted in said openings and of less length than the distance between the outer flanges of the end bars to permit limited longitudinal movement of the wires in the frame, a pivotal support, the side flanges of the frame being provided with notches to engage over said support and mount the frame in an inclined position, and a knocker to vibrate the frame.

In testimony whereof I affix my signature.

HARRY B. FANTON.